United States Patent Office 3,484,500
Patented Dec. 16, 1969

3,484,500
HYDROCARBON SEPARATION PROCESS
Alan Goldup, West Byfleet, Anthony B. Morrison, Nunthorpe, near Middlesbrough, and Michael Thomas Westaway, Ashford, England, assignors to The British Petroleum Company Limited, London, England, a corporation of England
No Drawing. Filed Sept. 6, 1966, Ser. No. 577,152
Claims priority, application Great Britain, Sept. 10, 1965, 38,705/65, 38,706/65; Apr. 27, 1966, 18,387/66
Int. Cl. C07c 7/12
U.S. Cl. 260—674                18 Claims

ABSTRACT OF THE DISCLOSURE

Isomers of $C_8$ or $C_9$ alkyl aromatics are separated from each other or from admixture with styrene by contacting a liquid or vapour mixture of the components with a phosphonitrilic compound to selectively adsorb one or more of the components and desorbing the more readily adsorbed component therefrom.

---

This invention relates to a process for the separation of components of alkyl-aromatic and alkenyl-aromatic hydrocarbon mixtures.

Allcock and Siegel (J.A.C.S., 1964, vol. 86, p. 5140) disclose that the compound tris-(o-phenylenedioxy) phosphonitrile trimer (tris-(o-phenylenedioxy)-cyclotriphosphazene), hereinafter referred to as TPNT, forms molecular inclusion compounds with certain organic liquids. The preferential absorption of one component of the liquid mixtures heptane-cyclohexane, hexane-benzene, hexane-cyclohexane, and carbon tetrachloride-benzene, is also mentioned. It will be seen that each of these comprises a cyclic and a non-cyclic component differing in molecular structure.

We have now found that preferential absorption occurs from the liquid or vapour phase on phosphonitrilic materials as hereinafter set forth, of one or more components of mixtures of hydrocarbons selected from alkyl-aromatic hydrocarbons having 8 or 9 carbon atoms and alkenyl-aromatic hydrocarbons having 8 or 9 carbon atoms.

Separations may be achieved between components of mixtures comprising any or all of the xylene isomers and ethylbenzene, or mixtures comprising any or all of the $C_9$ alkyl-aromatic isomers, or mixtures comprising any or all of the $C_9$ alkenyl-aromatic isomers, including their various geometrical isomers, and with or without styrene, or mixtures comprising any or all of the $C_8$ alkyl-aromatic hydrocarbons and any or all of the $C_9$ alkyl-aromatic hydrocarbons or mixtures comprising styrene and any or all of the $C_8$ alkyl-aromatic isomers or mixtures comprising styrene and any or all of the $C_9$ alkyl-aromatic isomers, or mixtures comprising any or all of the $C_8$ alkyl-aromatic isomers and any or all of the $C_9$ alkenyl-aromatic isomers, including their various geometrical isomers, or mixtures comprising any or all of the $C_9$ alkyl-aromatic isomers and any or all of the $C_9$ alkenyl-aromatic isomers, including their various geometrical isomers.

In general it is found that aromatic hydrocarbons having the structure

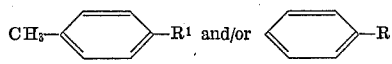

where $R^1$ is a methyl, ethyl, or vinyl group and where R is a methyl, ethyl, n-propyl, isopropyl or vinyl group, are absorbed preferentially to other $C_8$ and $C_9$ alkyl and/or alkenyl-aromatic hydrocarbons. Thus p-xylene is absorbed preferentially to m-xylene, p-ethyltoluene is absorbed preferentially to m-ethyl toluene, n-propylbenzene is absorbed preferentially to mesitylene, ethylbenzene is absorbed preferentially to m-xylene and styrene is absorbed preferentially to o-xylene. It is also generally found that aromatic isomers having the structure

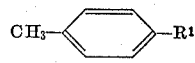

are preferentially absorbed to those having the structure

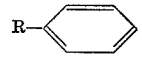

where R and $R^1$ are as defined above. Thus p-xylene is absorbed preferentially to ethylbenzene and p-ethyltoluene is absorbed preferentially to isopropylbenzene.

Thus, according to the present invention there is provided a process for the separation of one or more components of mixtures of hydrocarbons selected from alkyl-aromatic hydrocarbons having 8 or 9 carbon atoms and alkenyl-aromatic hydrocarbons having 8 or 9 carbon atoms comprising contacting a liquid or vapour mixture of the hydrocarbons with a compound which forms an inclusion complex more readily with one or more components of the mixture than with the other components and having the basic nuclear structure:

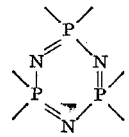

hereinafter referred to as a PNT-type structure, and desorbing the more readily absorbed component or components therefrom.

Operation in the vapour phase is preferred.

It is believed that in the presence of hydrocarbon molecules with which the PNT-type structure complexes (guest molecules) the phosphonitrilic material (host material) forms a structure having periodically recurring voids into which the guest molecules may fit.

As an example, in the case of TPNT it is believed that regular channels of hexagonal cross-section are formed in the presence of the guest molecules. The forces retaining the guest molecules within the channels are weak and thus guest molecules may readily be removed from the complex. On removal of the guest molecules it is believed that the TPNT crystal lattice is disrupted, to reform in the presence of further guest molecules.

Molecular shape is an important factor in determining the extent of absorption, i.e. the ease with which a guest molecule is accommodated within the PNT type structure. One facet of molecular shape is the cross section, but this, although important, is not the only criterion of absorption. We have, for example, found that TPNT absorbs p-xylene preferentially to ethylbenzene although these may be regarded as having very similar cross sections. A further example is the preferential absorption of p-ethyl toluene over isopropylbenzene by TPNT.

The preferred compound of PNT-type structure is TPNT. It has the formula:

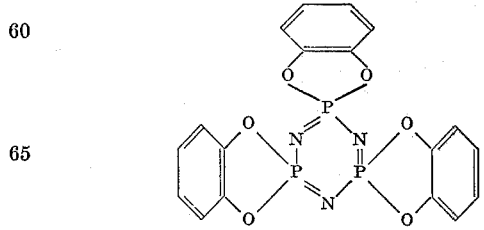

Other PNP-type materials which may form inclusion complexes of the type described are o-phenylenediamino-phosphonitrile trimer and 2,3-naphthyldioxy phosphonitrile trimer.

TPNT itself may be prepared by reacting phosphonitrilic chloride trimer $(PNCl_2)_3$ with catechol. Phosphonitrilic chloride trimer may be prepared, together with other phosphonitrilic derivatives, by reaction of ammonium chloride with phosphorus pentachloride. TPNT is a white crystalline solid melting at 244–245° C.

The PNT-type material may be used in its free state or may be pelleted or deposited on an inert support. Suitable supports are, for example ground firebrick, diatomaceous earth, silica gel, alumina, or porous glass. It may be preferable to silanise the support. The PNT-type material may also be deposited as a thin film on a laminar support, or on a fibrous support. We have found that the PNT-type material may be deposited from solution in an organic solvent by stirring and refluxing with the support material under nitrogen, cooling, filtering and drying under vacuum. We have deposited TPNT on 80–100 BSS mesh silanised diatomaceous earth from xylene solution in this way. We have also obtained TPNT loadings of from 5 to 30% wt. on 8–12 BSS mesh ground firebrick by saturating it with a 6% w./v. solution in xylene, evaporating off the solvent, and repeating the operation until the required loading is reached.

The support material should be so chosen as to provide, inter alia, a low pressure drop across the reactor containing the PNT-type material, and a high loading of PNT-type material per unit volume of the reactor, but care should be taken that the rate of equilibration of the PNT-type material with the hydrocarbon material is not too low.

The absorbate may be removed from the PNT-type material by displacement with another absorbate or by elution with an inert gas or liquid or by reduction in the ambient pressure i.e. reduction in the vapour pressure of the absorbed material (the so-called "pressure swing" technique). Desorption can also be obtained by increasing the temperature. Which method is chosen will depend on factors of which those skilled in the art will be aware, such as the cost of inert gas elution or the provision of means to reduce the pressure in the pressure swing process, but in the preferred vapour phase process a pressure reduction desorption technique is preferred, and a particularly suitable means of achieving such pressure reduction is by condensation of the desorbed material.

Processes employing any of the methods of desorption described are desirably operated on a cyclic basis, i.e. one cycle of complex formation and recovery of the complexed material is followed by another. We have found that satisfactory results may be obtained by the use of a fixed bed of absorbent, although this is not essential. The PNT material may complex with up to about 10% by wt. of its weight of hydrocarbon material, and it has been found most economic to operate at or near saturation capacity, removing only a portion of the absorbed molecules in each cycle. The feedstock to the absorbent bed may be diluted or undiluted. In the case of a vapour phase process an inert carrier gas, such as nitrogen, may be used.

A purging stage may optionally be employed between the absorption and desorption steps. This purging stage will use an inert gas or liquid, or purging will take place by pressure reduction, as appropriate, and by this means surface absorbed and non-sorbed material is removed. The purging stage may be omitted, for example, when the volume of the reactor in which desorption occurs is large enough, and the quantity of material removable by purging is small enough, for the relative concentration of such material to be neglected. In the case of the pressure reduction process it is essential that the absorption, purge and desorption pressures should decrease in this order, but it is not necessary that these pressures should be distinct and uniform. Purging and desorption may be conveniently carried out as a continuous process by progressive pressure reduction.

Any suitable combination of absorption, purging and desorption techniques may be used, if desired. One example of such a combined process would be a vapour phase absorption, followed by purging with an inert gas, and finally desorption by pressure reduction. Where a diluted feed is used purging may be carried out by reduction in the feed concentration. The use, in a vapour phase process, of a feed diluted with inert gas enables the pressure at any stage in the process to exceed the vapour pressure of the hydrocarbon components of the feed at the process temperature. If the pressure rises above the hydrocarbon vapour pressure when an undiluted feed is used then liquifaction will occur, which may be undesirable.

It may be desirable, in addition, to employ a number of absorbent beds in succession and to pass the effluent from one bed, enriched in one or more components of the feed to that bed, to a further bed.

Tables 1, 2 and 3 below show the ranges from which the reaction conditions of a liquid phase-inert liquid desorption process, a vapour phase-inert gas desorption process, and a vapour phase-pressure reduction desorption process, respectively, may be chosen. It will be realised that the cycle ranges take into account the use of a diluted or undiluted feed and the use or not of a purge stage.

The following are common to all three types of process:

| | |
|---|---|
| Ratio bed length to diameter | From 30:1 to 1:1. |
| Particle size | From 4 to 100 mesh BSS. |
| Temperature | 15–250° C. for all stages. |

TABLE 1

| | |
|---|---|
| Inlet pressure | From 10 to 5,000 p.s.i.a. |
| Cycle: | |
| Absorption | From 0.1 to 10 LHSV plus inert liquid (up to 50 LHSV). |
| Optional purge | Inert liquid (up to 50 LHSV). |
| Desorption | Do. |
| Cycle times: | |
| Absorption | From 10 secs. to 60 minutes. |
| Purge | Do. |
| Desorption | From 10 secs. to 5 hours. |

TABLE 2

| | |
|---|---|
| Pressure | From 10 to 1,000 p.s.i.a. |
| Cycle: | |
| Absorption | From 0.1 to 10 LHSV plus inert gas (up to 1,000 GHSV). |
| Optional purge | Inert gas (up to 1,000 GHSV). |
| Desorption | Do. |
| Cycle times: | |
| Absorption | From 10 secs. to 60 minutes. |
| Purge | Do. |
| Desorption | From 10 secs. to 5 hours. |

TABLE 3

| | |
|---|---|
| Cycle: Absorption | From 0.1 to 10 LHSV plus inert gas (up to 1,000 GHSV). |
| Pressure: | |
| Absorption | From 10 to 1,000 p.s.i.a. |
| Optional purge | From 1 to 100 p.s.i.a. |
| Desorption | From 0.1 to 10 p.s.i.a. |
| Cycle times: | |
| Absorption | From 10 secs. to 60 minutes. |
| Purge | Do. |
| Desorption | From 10 secs. to 5 hours. |

In Tables 2 and 3 the feed space velocity is calculated as the liquid, although the feed is in the vapour phase. The actual values chosen from the above ranges will depend, among other factors, on the nature of the feed to the process, the purity of the product(s) and the nature of the PNT material used, for example, its decomposition temperature, whether it is supported or not, and the nature of the support.

The following are the preferred ranges of conditions for a vapour phase process, using TPNT for the separation of components of a mixture of $C_8$ alkyl-aromatic isomers. Table 4 shows the conditions for an inert gas desorption process and Table 5 gives those for a pressure reduction desorption process. The ranges of ratio of bed length to diameter, particle size, temperature, and cycle times shown in Table 4 are also applicable to Table 5.

TABLE 4

| | |
|---|---|
| Ratio bed length to diameter | From 20:1 to 4:1. |
| Particle size | From 4 to 100 BSS mesh. |
| Temperature | From 100 to 240° C. |
| Pressure | From 10 to 500 p.s.i.a. |
| Cycle: | |
| Absorption | From 0.2 to 5 LHSV plus inert gas (up to 500 GHSV). |
| Optional purge | Inert gas (up to 500 GHSV). |
| Desorption | Do. |
| Cycle times: | |
| Absorption | From 30 secs. to 15 minutes. |
| Purge | Do. |
| Desorption | From 120 secs. to 150 minutes. |

TABLE 5

| | |
|---|---|
| Pressure: | |
| Absorption | From 10 to 500 p.s.i.a. |
| Optional purge | From 1 to 20 p.s.i.a. |
| Desorption | From 0.1 to 5 p.s.i.a. |
| Cycle: Absorption | From 0.2 to 5 LHSV plus inert gas (up to 500 GHSV). |

If an undiluted feed is used the upper limit of pressure in both Tables 4 and 5 is about 150 p.s.i.g., since this is the vapour pressure of the feed at the decomposition temperature of TPNT. The upper limits of pressure shown are applicable when a diluted feed is used.

In a cyclic process using a number of fixed beds the cycle times for absorption, purge and desorption should be in simple ratios to each other to facilitate switching.

In a mixture containing the $C_8$ alkyl-aromatic isomers p-xylene and ethylbenzene are absorbed preferentially to o-xylene and m-xylene. Although there is a difference in the selectivity of absorption of TPNT between p-xylene and ethylbenzene, these two isomers are more strongly absorbed than are o- and m-xylene. One cycle of PNT absorption/desorption alone will produce fractions enriched in one or more components of a hydrocarbon mixture and further cycles will produce substantially pure components. The desorption time will be greater the more strongly absorbed is a given component. Thus, it is possible to produce, in one cycle, from a 25:25:50% wt. p-xylene-ethylbenzene-m-xylene mixture, a concentrate containing only 4% wt. of constituents other than m-xylene, using a relatively long desorption time to remove the more strongly held p-xylene and ethylbenzene introduced from the previous cycle which would otherwise contaminate the m-xylene front. Alternatively a fraction can be obtained in one cycle from the same mixture containing only 3% wt. m-xylene, the remainder of the fraction being p-xylene and ethylbenzene. In this case the desorption time can be comparatively short.

The invention is illustrated by the following examples:

EXAMPLE 1

In a process for separating m- from p-xylene a vapour mixture of these two isomers was passed into a fixed bed reactor (30 cm. x 3 cm. internal diameter, 212 ml. capacity) containing 43 g. of TPNT deposited on an equal weight of 80-100 BSS mesh silanised diatomaceous earth. During this sorption stage the p-xylene was preferentially absorbed and an enriched m-xylene effluent was obtained. The non-sorbed hydrocarbon was then purged from the reactor using nitrogen and to complete the cycle further nitrogen was passed through the reactor to desorb the sorbed p-xylene. All gases and vapours to the reactor were preheated and the bed temperature was maintained at 155° C. The process was operated on a cyclic basis, one sorption/purge/desorption cycle being followed by another. The effluent gases and vapours from the reactor were directed by suitable valves into condensers where the enriched p- and m-xylene fractions were recovered. Using the flow conditions given in Table 6 the process yielded 10.5 mls. of 84% wt. m-xylene and 8.6 mls. of 97% p-xylene from 45 mls. of an equal volume mixture of the two isomers in the course of ten isobaric cycles at atmospheric pressure.

TABLE 6

| | |
|---|---|
| Sorption: | |
| Feed | p- and m-xylene (50/50 v./v.). |
| Feed rate | 1.8 ml./min. (liquid) or (0.51 LHSV). |
| Diluent | Nitrogen at 495 ml./min. (14 GHSV). |
| Time | 2.5 minutes. |
| Purge: | |
| Inert gas | Nitrogen. |
| Flow rate | 670 ml./min. (190 GHSV). |
| Time | 1.25 minutes. |
| Desorption: | |
| Inert gas | Nitrogen. |
| Flow rate | 670 ml./min. (190 GSHV). |
| Time | 6 minutes. |

By increasing the desorption time to about one hour so that the p-xylene content of the bed was reduced to a very low level and increasing the sorption time to six minutes it was possible to recover m-xylene approaching 100 percent purity during the sorption stage as well as 97 percent pure p-xylene during desorption.

EXAMPLE 2

Using a typical commercially available xylene fraction in place of the p-/m-xylene feed used in Example 1 but otherwise maintaining the same flow conditions given in Table 6 it was possible to recover during the desorption cycle a product considerably enriched in p-xylene. The feed and desorbate compositions and yield over ten cycles were as follows:

| Feed composition (percent wt.) | Feed introduced over 10 cycles | Desorbate composition (percent wt.) | Desorbate recovered over 10 cycles |
|---|---|---|---|
| m-Xylene, 51.2 | 45 ml | m-Xylene, 4 | 8.7 ml. |
| p-Xylene, 22.8 | | p-Xylene, 66 | |
| o-Xylene, 7.3 | | Ethylbenzene, 30 | |
| Ethylbenzene, 16.6 | | | |
| Toluene, 0.3 | | | |
| Paraffins and naphthenes, 1.8 | | | |

EXAMPLE 3

The reactor of Example 1 was filled with 38 g. of TPNT deposited on 76 g. of 8-12 mesh BSS firebrick. The feed was the same as in Example 1 but this time a pressure swing cycle was used. The bed temperature was maintained at 165° C. throughout and the other conditions were as set out in Table 7.

TABLE 7

| | |
|---|---|
| Absorption: | |
| Feed and feed rate | m- and p-xylene (50/50 v./v.) at 1.8 ml./min. (liquid) or (0.51 LHSV) plus $N_2$ (25 ml./min. or 7 GHSV). |
| Pressure | Atmospheric. |
| Time | 4 minutes. |
| Purge (by reducing pressure): | |
| Final Pressure | 110 mm. mercury (2.1 p.s.i.a.). |
| Time | 2.5 minutes. |
| Desorption (by reducing pressure): | |
| Final Pressure | 25 mm. mercury (0.5 p.s.i.a.). |
| Time | 15 minutes. |

Under these flow conditions in one cycle 7.2 ml. of 50/50% v./v. m-/p-xylene were used to yield 1.15 ml. of 85% pure m-xylene and 1.05 ml. of 90% pure p-xylene.

EXAMPLE 4

A mixture of equal volumes of all the $C_9$ alkyl-aromatic isomers was mixed at room temperature and pressure with unsupported TPNT in an amount such that there was an excess of liquid.

After standing, the liquid was filtered off and the TPNT dried. The hydrocarbons absorbed, after separation from the TPNT, were analysed by gas-liquid chromatography and found to have the following compositions:

| | Percent wt. |
|---|---|
| Iso-propyl benzene | 3.6 |
| n-Propyl benzene | 44.0 |
| 1-methyl-4-ethyl benzene | 42.1 |

The result shows that the mono-substituted and the para-disubstituted $C_9$ alkyl aromatics are selectively absorbed by TPNT.

What we claim is:

1. A process for the separation of components from mixtures of hydrocarbons consisting of at least one component selected from p-xylene, ethyl benzene and mono and para di-substituted $C_9$ alkyl benzenes and at least one component selected from o-xylene, m-xylene, ortho and para di-substituted $C_9$ alkyl benzenes and tri-substituted $C_9$ alkyl benzenes, which process comprises contacting the liquid or vapor mixture of hydrocarbons with a phosphonitrilic compound which forms an inclusion complex more readily with one or more of the former components than with the latter, and having the basic nuclear structure

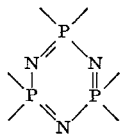

and desorbing the more readily absorbed component therefrom.

2. A process as claimed in claim 1 in which the mixture consists of p-xylene, ethyl benzene and ortho and m-xylene.

3. A process as claimed in claim 1 in which the mixture consists of all the $C_9$ alkyl benzenes.

4. A process as claimed in claim 1, in which the said compound is tris-(o-phenylenedioxy) phosphonitrile trimer.

5. A process as claimed in claim 1, in which desorption is carried out by displacement of the absorbed components by another absorbate, by elution with an inert gas or liquid or by reduction in the ambient pressure.

6. A process as claimed in claim 5, being a vapour phase process, in which desorption is carried out by reduction in the ambient pressure, such reduction in pressure being achieved by condensation of the desorbed material.

7. A process as claimed in claim 1 operated on a cyclic basis.

8. A process as claimed in claim 7, operated at or near the saturation capacity of the said compound, only a portion of the absorbed molecules being removed in each cycle.

9. A process as claimed in claim 1, in which the feed to the absorbed bed is diluted with an inert gas in the case of a vapour phase process or an inert liquid in the case of a liquid phase process.

10. A process as claimed in claim 1, in which a purging stage is interposed between the absorption and desorption steps.

11. A process as claimed in claim 10, in which purging is carried out by the same means as that used for desorption.

12. A process as claimed in claim 10, in which purging and desorption are achieved successively by reduction in the ambient pressure, it being provided that the ambient pressure decreases in the order: absorption, purge, desorption.

13. A process as claimed in claim 10, in which purging and desorption are achieved by elution with an inert gas or liquid.

14. A liquid phase process as claimed in claim 1, in which the reaction conditions are chosen from the ranges set forth:

| | |
|---|---|
| Inlet pressure | From 10 to 5,000 p.s.i.g. |
| Cycle: | |
|   Absorption | From 0.1 to 10 LHSV plus inert liquid (up to 50 LHSV). |
|   Optional purge | Inert liquid (up to 50 LHSV). |
|   Desorption | Do. |
| Cycle times: | |
|   Absorption | From 10 secs. to 60 minutes. |
|   Purge | Do. |
|   Desorption | From 10 secs. to 5 hours. |

15. A vapour phase process as claimed in claim 1, in which the reaction conditions are chosen from the ranges set forth:

| | |
|---|---|
| Pressure | From 10 to 1,000 p.s.i.a. |
| Cycle: | |
|   Absorption | From 0.1 to 10 LHSV plus inert gas (up to 1,000 GHSV). |
|   Optional purge | Inert gas (up to 1,000 GHSV). |
|   Desorption | Do. |
| Cycle times: | |
|   Absorption | From 10 secs. to 60 minutes. |
|   Purge | Do. |
|   Desorption | From 10 secs. to 5 hours. |

16. A vapour phase process as claimed in claim 1 in which the reaction conditions are chosen from the ranges set forth:

| | |
|---|---|
| Cycle: Absorption | From 0.1 to 10 LHSV plus inert gas (up to 1,000 GHSV). |
| Pressure: | |
|   Absorption | From 10 to 1,000 p.s.i.a. |
|   Optional purge | From 1 to 100 p.s.i.a. |
|   Desorption | From 0.1 to 10 p.s.i.a. |
| Cycle times: | |
|   Absorption | From 10 secs. to 60 min. |
|   Purge | Do. |
|   Desorption | From 10 secs. to 5 hours. |

17. A vapour phase process as claimed in claim 1, for the separation of the components of a mixture of alkyl-aromatic isomers having 8 carbon atoms using tris-(o-phenylenedioxy) phosphonitrile trimer as the absorbent and desorbing by elution with nitrogen, in which the reaction conditions are chosen from the following ranges:

| | |
|---|---|
| Ratio bed length to diameter | From 20:1 to 4:1. |
| Particle size | From 4 to 100 BSS mesh. |
| Temperature | From 100 to 240° C. |
| Pressure | From 10 to 500 p.s.i.a. |
| Cycle: | |
|   Absorption | From 0.2 to 5 LHSV plus inert gas (up to 500 GHSV). |
|   Optional purge | Inert gas (up to 500 GHSV). |
|   Desorption | Do. |
| Cycle times: | |
|   Absorption | From 30 secs. to 15 minutes. |
|   Purge | Do. |
|   Desorption | From 120 secs. to 150 minutes. |

18. A vapour phase process as claimed in 1, for the separation of the components of a mixture of alkyl-aromatic isomers having 8 carbon atoms, using tris-(o-phenylenedioxy) phosphonitrile trimer as the absorbent and desorbing by reduction in the ambient pressure, in which the reaction conditions are chosen from the following ranges:

| | |
|---|---|
| Ratio bed length to diameter | From 20:1 to 4:1. |
| Particle size | From 4 to 100 BSS mesh. |
| Temperature | From 100 to 240° C. |
| Pressure: | |
|   Absorption | From 10 to 500 p.s.i.a. |
|   Optional purge | From 1 to 20 p.s.i.a. |
|   Desorption | From 0.2 to 5 p.s.i.a. |
| Cycle: Absorption | From 0.2 to 5 LHSV. |
| Cycle times: | |
|   Absorption | From 30 secs. to 15 minutes. |
|   Purge | Do. |
|   Desorption | From 120 secs. to 150 minutes. |

References Cited

Allcock et al.: Journal of the Americal Chemical Society, vol. 86, pp. 5140–5144, 1964.

DELBERT E. GANTZ, Primary Examiner

C. E. SPRESSER, Assistant Examiner

U.S. Cl. X.R.

260—669